No. 673,778. Patented May 7, 1901.
F. W. MERRITT.
CHALK LINE REEL.
(Application filed Jan. 13, 1900. Renewed Oct. 12, 1900.)
(No Model.)
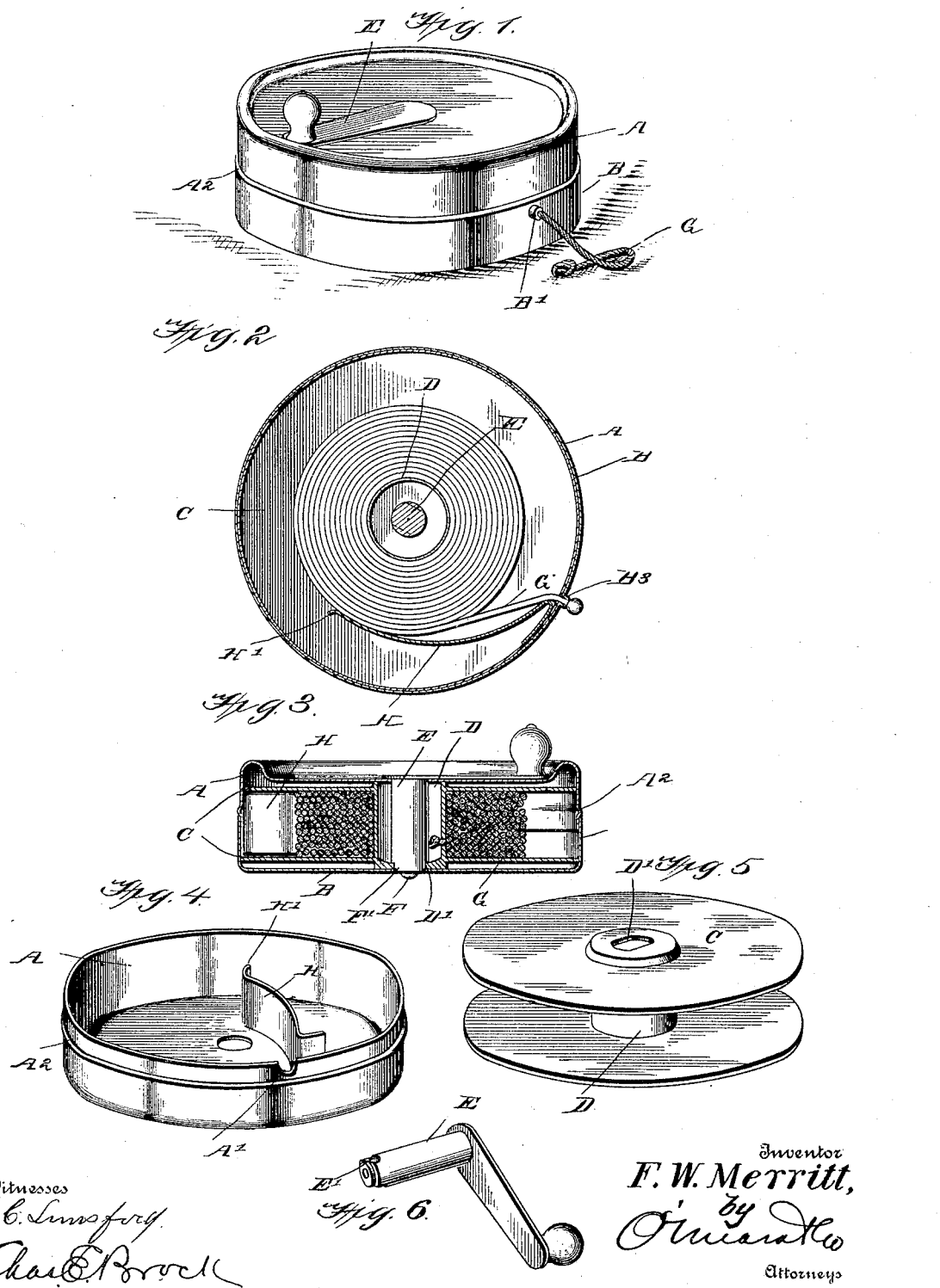
Witnesses
Inventor
F. W. Merritt,
by
Attorneys

UNITED STATES PATENT OFFICE.

FRANK W. MERRITT, OF NEW BRUNSWICK, NEW JERSEY.

CHALK-LINE REEL.

SPECIFICATION forming part of Letters Patent No. 673,778, dated May 7, 1901.

Application filed January 13, 1900. Renewed October 12, 1900. Serial No. 32,894. (No model.)

*To all whom it may concern:*

Be it known that I, FRANK W. MERRITT, a citizen of the United States, residing at New Brunswick, in the county of Middlesex and State of New Jersey, have invented a new and useful Chalk-Line Reel, of which the following is a specification.

This invention is an improved construction of chalk-line reel, the object being to provide an exceedingly cheap and simple device for conveniently carrying a chalking-line used by carpenters and other mechanics. Heretofore reels of this character have been either complicated and expensive or the cheaper grades have been inoperative on account of the cord binding either during the reeling or unreeling operation.

My invention is intended to avoid all of these difficulties, and I accomplish the same by arranging a spring within the shell or casing which contains the reel, thereby disposing the said cord evenly, so that all binding is prevented.

The invention consists also in the peculiar construction of the various parts and in their novel combination and arrangement, all of which will be fully described hereinafter and pointed out in the claims.

In the drawings forming part of this specification, Figure 1 is a perspective view of a chalk-line reel constructed in accordance with my invention. Fig. 2 is a longitudinal sectional view of the same. Fig. 3 is a transverse sectional view. Fig. 4 is an inverted perspective view showing half of the shell or casing. Fig. 5 is a detail perspective view of the reel, and Fig. 6 is a perspective view of the crank for operating the reel.

In carrying out my invention I employ a cylindrical shell or casing, which is composed of two sections A and B, telescoped together and securely fastened, as hereinafter described. The face of the section A is depressed, thereby stiffening said section and also providing a circular depression for the crank-arm to travel in. The reel, which is arranged within the shell or casing, comprises the circular disks C and the spool D, connecting the said disks, said spool being open at one end and closed at the opposite end, said closed end having an opening D', which has or more flat faces, as shown, said opening being intended to receive the end E' of the crank E, which crank passes through the section A and spool D and is fastened into said spool by means of a screw F, which passes through the center of section B up into the crank-shaft, thereby securely fastening the crank-shaft, reel, and sections together.

In practice I prefer to make an annular corrugation $A^2$ upon the exterior of the section A to limit the telescoping movement of the sections A and B and also for the purpose of strengthening the shell or casing. The cord G is wound upon the reel in the usual manner, one end of the said cord or line being fastened to the spool and the other end passing out through an opening B' produced in the section B, the section A being notched, as shown at A', in order to permit said end passing through the opening B'. A leaf-spring H is fastened to the inner side of the section A, said spring being of a width sufficient to fill the space between the disks of the reel, but at the same time permit the free revolution of said reel, and the said spring is curved or arched intermediate its ends, as most clearly shown, in order to conform to the cord as it is wound upon the reel, the purpose of said spring being to constantly exert a pressure upon the said cord, thereby causing the same to be wound evenly upon the reel, thus preventing binding or catching either during the reeling or unreeling operation. The free end of the spring H' is curved, as shown, in order to prevent the said end catching upon the cord. It will also be noted that the spring is attached to the inner side of the section A, adjacent to the notch thereof, thereby serving as an additional guide for the cord in passing to and from the reel.

In practice the cord is wound upon the reel and said reel inserted in section A, the desired quantity of chalk being placed between the disks before the section B is set in place. After the sections are put together the crank-shaft is passed through the spool and section A, as previously described.

When it is desired to use the chalk-line, the free end, which always remains upon the outside, is grasped and any desired length of line unreeled. When it becomes necessary to rewind the line, the crank-handle is operated, causing the line to be wound upon the reel, and the constant pressure of the spring prevents the line's piling up too much on one side, inasmuch as it forces the cord to wind evenly, and in this manner all binding is avoided.

Having thus fully described my invention, what I claim as new, and desire to secure by Letters Patent, is—

1. A chalk-line reel comprising two telescopic sections, each of which is perforated centrally, and the wall of one of them is provided with an opening near its edge and the edge of the wall of the other one is notched to register with said opening, a curved spring secured to said wall adjacent to the notch, the free end of which projects inwardly and is curved and a spool journaled within said sections, substantially as described.

2. A chalk-line reel comprising two telescopic sections, each of which is perforated centrally and one of them is provided with an opening and the other one is provided with a spring, a spool within the casings, the center of which is perforated longitudinally, one end of the perforation being closed except a straight-sided opening, at one end, a shaft through said perforation, one end of which is formed angular to fit in said straight-walled opening and the other end extends through one of the sections, a handle on said projecting portion, and a screw through the other section, the inner end of which projects into the end of the shaft, substantially as described.

3. A chalk-line reel comprising a cylindrical shell or casing formed of two sections telescoped together, a reel arranged within the said shell or casing, said reel consisting of the disks and connecting-spool, said spool being open at one end and closed at the other, said closed end having an opening formed with one or more straight faces, a crank passing through the spool, and one of the sections, and secured by means of a screw passing through the other section into the end of the crank-shaft, a cord fastened at one end to the spool, the other end passing through an opening in one section of the case, the other section being notched to guide the cord and the spring attached to the said notched section of the case at a point adjacent to said notch, said spring being adapted to bear upon the cord, substantially as and for the purposes set forth.

FRANK W. MERRITT.

Witnesses:
   MILES V. BENNETT,
   E. F. GOODWIN.